(12) United States Patent
Rosner

(10) Patent No.: US 7,200,695 B2
(45) Date of Patent: Apr. 3, 2007

(54) METHOD, SYSTEM, AND PROGRAM FOR PROCESSING PACKETS UTILIZING DESCRIPTORS

(75) Inventor: Gedon Rosner, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 10/663,027

(22) Filed: Sep. 15, 2003

(65) Prior Publication Data

US 2005/0060443 A1  Mar. 17, 2005

(51) Int. Cl.
G06F 3/00 (2006.01)
(52) U.S. Cl. .............................. 710/52; 710/5; 710/36; 710/48
(58) Field of Classification Search ................ 710/5, 710/36, 53, 54, 55, 56, 57
See application file for complete search history.

(56) References Cited

U.S. PATENT DOCUMENTS 6,912,602 B2 * 6/2005 Sano et al. ................... 710/22

2003/0002591 A1 * 1/2003 Boneh et al. ............... 375/295
2003/0140196 A1 * 7/2003 Wolrich et al. ............. 711/118
2004/0218631 A1 * 11/2004 Ganfield ..................... 370/474

* cited by examiner

Primary Examiner—Kim Huynh
Assistant Examiner—Alan S. Chen
(74) Attorney, Agent, or Firm—David W. Victor; Konrad Raynes & Victor LLP (57) ABSTRACT

Provided are a method, system, and program for processing packets from an Input/Output (I/O) device. Information is maintained indicating a first buffer and second buffer for use with each descriptor, wherein one of the first and second buffers is assigned to the descriptor used by the I/O device, and wherein the I/O device write packets to the buffers assigned to the descriptors. The first buffer including a packet from the I/O device is accessed, wherein the accessed first buffer is assigned to an accessed descriptor. The packet in the accessed first buffer is processed and if the second buffer assigned to the accessed descriptor is available, then information for the accessed descriptor is updated to indicate that the second buffer is assigned to the accessed descriptor before completing the processing of the packet in the first buffer.

31 Claims, 7 Drawing Sheets

METHOD, SYSTEM, AND PROGRAM FOR PROCESSING PACKETS UTILIZING DESCRIPTORS

BACKGROUND OF THE INVENTION

1. Field of the Invention

The present invention relates to a method, system, and program for processing packets.

2. Description of the Related Art

In a network environment, a network adapter coupled to a host computer, such as an Ethernet card, Fibre Channel card, etc., will receive Input/Output (I/O) requests or responses to I/O requests initiated from the host. Often, the host computer operating system includes a device driver to communicate with the network adapter hardware to manage I/O requests to transmit over a network. Data packets received at the network adapter would be stored in an available allocated packet buffer in the host memory. The host computer further includes a transport protocol driver to process the packets received by the network adapter that are stored in the packet buffer, and access any I/O commands or data embedded in the packet. For instance, the transport protocol driver may implement the Transmission Control Protocol (TCP) and Internet Protocol (IP) to decode and access the payload data in the TCP/IP packets received at the network adapter.

The network adapter hardware maintains a ring of descriptors that point to buffers in the system memory to which the network adapter may write packets. A "descriptor" refers to a data structure that points to a buffer in memory that is used to store data, such as packets, where different buffer addresses may be assigned to the "descriptor". The network adapter may use an on-board Direct Memory Access (DMA) engine to write packets to buffers in the host memory that are assigned to descriptors that are indicated as available. The device driver receives an interrupt from the network adapter indicating that packets were written to the buffers. The device driver will then wrap the packet in the buffer with information used by the operating system and make the buffer and wrapped packet available to the protocol driver, which may spawn a protocol stack thread to process. A different protocol stack thread may be spawned to process different packet buffers. When the spawned protocol stack thread completes processing the packet buffer, the protocol stack may return the buffer to the device driver by calling a return packet handler function, and the device driver may place the buffer into an available buffer pool. A return packet handler function is called to assign an available buffer to a descriptor and signal the network adapter hardware that the freed buffer and its corresponding descriptor are now available.

Because the protocol driver may spawn multiple threads to process packet buffers, multiple threads executing in one or more central processing units (CPUs) may be concurrently processing packet buffers written to by the network adapter. These spawned threads would also attempt to write to a software queue, such as the available buffer pool, and the hardware descriptors when completing processing of a packet buffer. In the prior art, a spin lock is used to serialize the attempts to update shared memory structures, such as the available buffer pool and the hardware descriptor in the network adapter, to indicate the availability of the reassigned descriptor. Thus, each spawned protocol stack thread must consume CPU resources to acquire and release the spin lock that is needed in order to update the hardware and software shared memory structures related to the descriptors. As the number of CPUs increase in a system, an increased amount of time and processing resources are consumed acquiring and releasing the spin lock.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
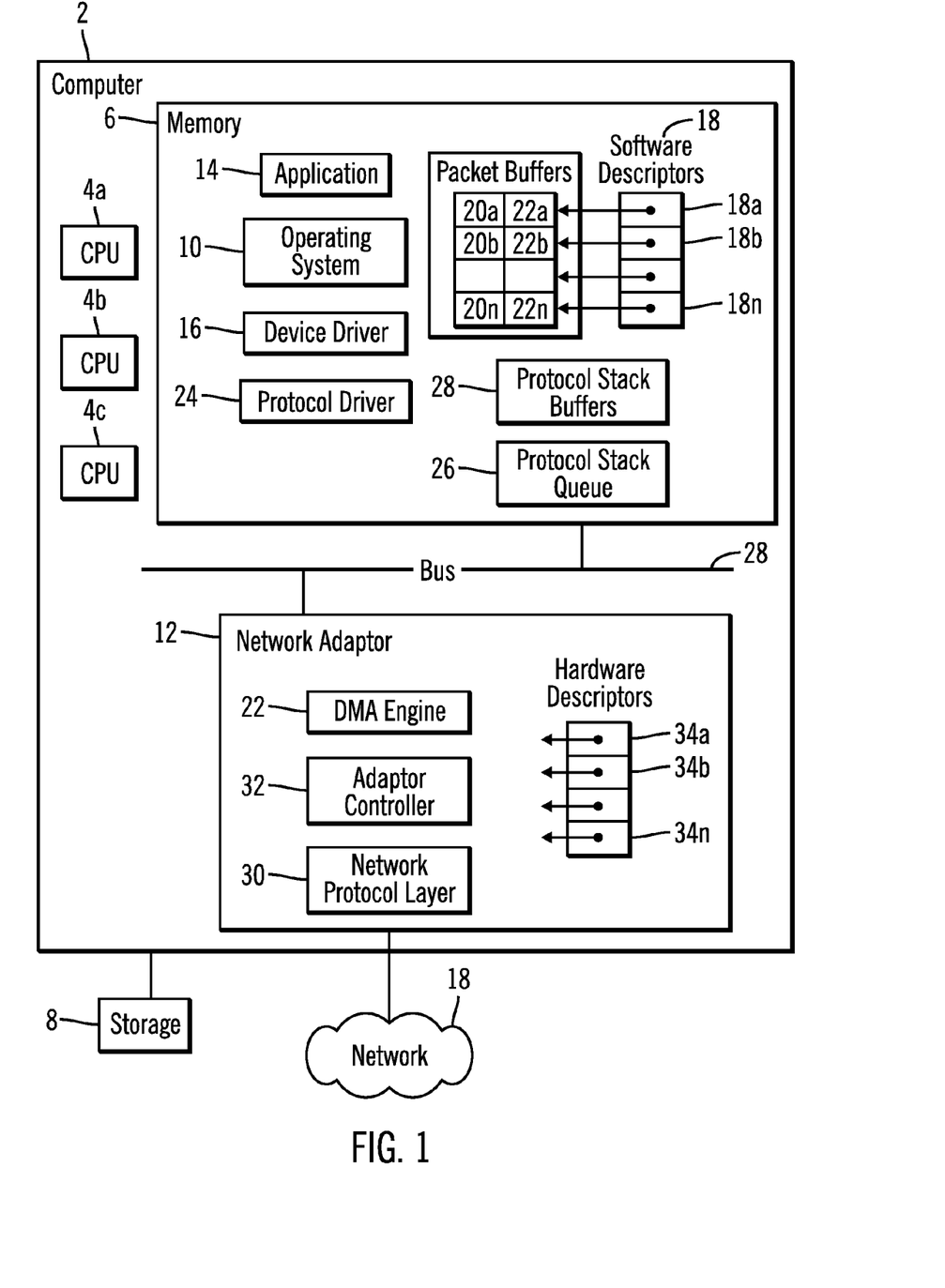
FIG. 1 illustrates a computing environment in which embodiments of the invention are implemented.

FIG. 1 illustrates a computing environment in which aspects of the invention may be implemented. A computer 2 includes one or more central processing units (CPU) 4a, 4b, 4c, a volatile memory 6, non-volatile storage 8, an operating system 10, and a network adapter 12. An application program 14 further executes in memory 6 and is capable of transmitting and receiving packets from a remote computer (not shown) over network 18. The computer 2 may comprise any computing device known in the art, such as a mainframe, server, personal computer, workstation, laptop, handheld computer, telephony device, network appliance, virtualization device, storage controller, etc. Any CPU 4a, 4b, 4c and operating system 10 known in the art may be used. Programs and data in memory 6 may be swapped into storage 8 as part of memory management operations.

A device driver 16 executes in memory 6 and includes network adapter 12 specific commands to communicate with the network adapter 12 and interface between the operating system 10 and the network adapter 12. The device driver 16 allocates packet buffers in memory 6 to store packets from the network adapter 12. The network adapter 12 determines available descriptors and writes packets to the buffers assigned to the available descriptors. In described embodiments, the device driver 16 maintains software descriptor elements 18, where each descriptor element 118a, 18b . . . 18n points to a pair of pre-assigned packet buffers 20a, 20b . . . 20n and 22a, 22b . . . 22n. The descriptors 18a, 18b . . . 18n point to the buffers, and the hardware and software use the descriptors to manage the buffers. For instance, a descriptor contains a memory address (i.e., a pointer) of a buffer and is loaded from the system memory 18 into the network adapter 12 hardware. Based on this descriptor, the network adapter 12 hardware can then Direct Memory Access (DMA) the data (packet) it received from the network into that buffer address (in system memory). The descriptor thus "tells" the network adapter hardware were to DMA the data. The network adapter hardware then writes the descriptor back to system memory setting the status of the descriptor to "done". The device driver 16 can then determine from that descriptor and indicate the new buffer to the operating system 10. A packet written to one descriptor 18a, 18b . . . 18n will be stored in one of the pair of packet buffers 20a and 22a, 20b and 22b . . . 20n and 22n assigned to that descriptor 18a, 18b . . . 18n. A protocol driver 24 implements a protocol, such as such as a TCP/IP protocol driver, iSCSI protocol driver, Fibre Channel protocol driver, etc., in which the packets are coded and processes the packets to access the data therein. The device driver 16 indicates the buffers to the protocol driver 24 for processing via the protocol stack. The protocol driver 24 may either copy the buffer to its own protocol owned buffer, such as the protocol stack buffers 28, or use the original buffer indicated by the device driver 16 to process with a protocol stack thread.

The network adapter 12 communicates with the device driver 16 via a bus interface 28, which may implement any bus protocol known in the art.

The network adapter 12 includes a network protocol layer 30 for implementing the physical communication layer to send and receive network packets to and from remote devices over a network 18. The network 18 may comprise a Local Area Network (LAN), the Internet, a Wide Area Network (WAN), Storage Area Network (SAN), a wireless network, etc. In certain embodiments, the network adapter 12 and network protocol layer 30 may implement the Ethernet protocol, Gigabit (1 or 10) Ethernet, token ring protocol, Fibre Channel protocol, Infiniband, Serial Advanced Technology Attachment (SATA), parallel SCSI, serial attached SCSI cable, etc., or any other network communication protocol known in the art. The network adapter 12 further includes a DMA engine 22, which writes packets to buffers assigned to available descriptors. The adapter controller 32 includes hardware logic to perform adapter 12 related operations. The network adapter 12 maintains hardware descriptor elements 34a, 34b . . . 34n, each corresponding to one software descriptor element 18a, 18b . . . 18n. In this way, the descriptor elements are represented in both the network adapter hardware and the device driver software. Further, the descriptors, represented in both hardware and software, are shared between the device driver 16 and the network adapter 12. The descriptors 18 are allocated in system memory 6 and the device driver 16 writes a buffer address in the descriptor and submits the descriptor to the network adapter 12. The adapter then loads the descriptor 34a, 34b . . . 34n and uses the buffer address to DMA the packet data into the network adapter 12 hardware to process. When the DMA operations are complete, the hardware "writes back" the descriptor to system memory 6 (with a "Descriptor Done" bit, and other possible status bits). The device driver 16 then takes the descriptor which is "done" and indicates the corresponding buffer to the protocol driver 24.

In certain embodiments, the hardware descriptors 34a, 34b . . . 34n are allocated in system memory 6, and the network adapter 12 would load the available descriptors 34a, 34b. 34n into the hardware. In such case, the system memory 6 would include a matching set of descriptors to descriptors 34a, 34b . . . 34n (not shown) that the network adapter 12 would itself load from the system memory 6 to the adapter 12 for internal processing and then update ("writes back") when the corresponding buffers are filled. In such embodiments, the software descriptors 18 are a separate set of descriptors which are not accessed by the network adapter 12, but which "mirror" the hardware descriptors.

Figure 2:
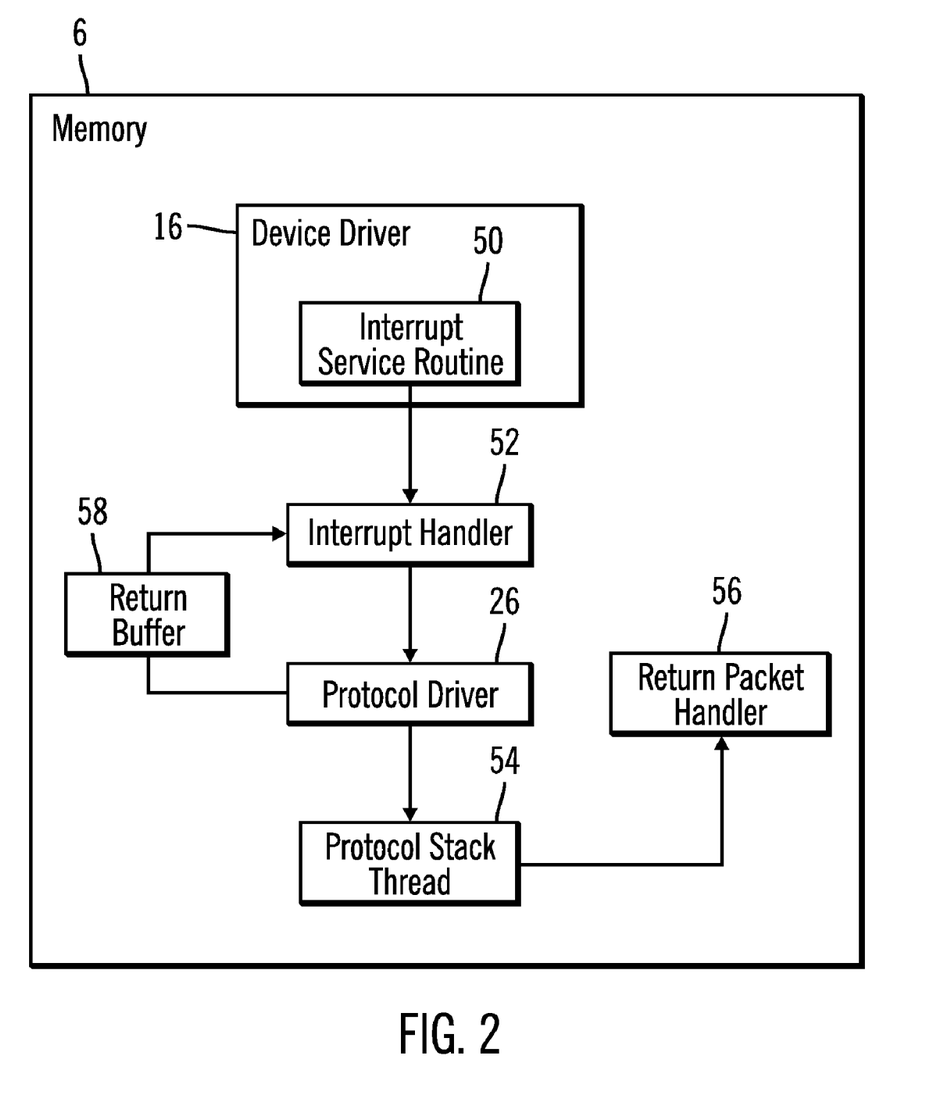
FIG. 2 illustrates a program flow of component processing in accordance with embodiments of the invention.

FIG. 2 illustrates a flow of operations in the memory 6 to process packets received from the network adapter 12. The device driver 16 includes an interrupt service routine (ISR) 50 to handle an interrupt received from the network adapter 12 over the bus 28. The interrupt service routine 50 may spawn an interrupt handler 52 thread to handle the interrupt. In alternative implementations, a separate thread may not be spawned and the interrupt service routine 50 may process the interrupt itself. In certain operating systems, if the interrupt service routine 50 spawns the interrupt handler 52, there can only be one interrupt handler running in such operating system at a given time. The interrupt handler 52 indicates a buffer including a packet to the protocol driver 26. The protocol driver 26 would spawn a protocol stack thread 54 to process the packet in the buffer. After completing the processing of the packet in the buffer, the protocol stack thread 54 would call a return packet handler 56 to update the software descriptor status to indicate that the buffer 20a, 20b . . . 20n, 22a, 22b . . . 22n just processed is available for reuse with the descriptor. Additionally, the interrupt handler 52 may request the protocol driver 26 to immediately return a buffer if the other buffer for the software descriptor element 18a, 18b . . . 18n is unavailable. In such case, the protocol driver 26 would immediately return the buffer 58 to the interrupt handler in the manner described below. This ensures that one of the two preassigned buffers is available for the descriptor and for use by the hardware for that descriptor. In certain embodiments, the interrupt handler 52 and the protocol driver 26 may all execute on the same thread of execution.

Figure 3:
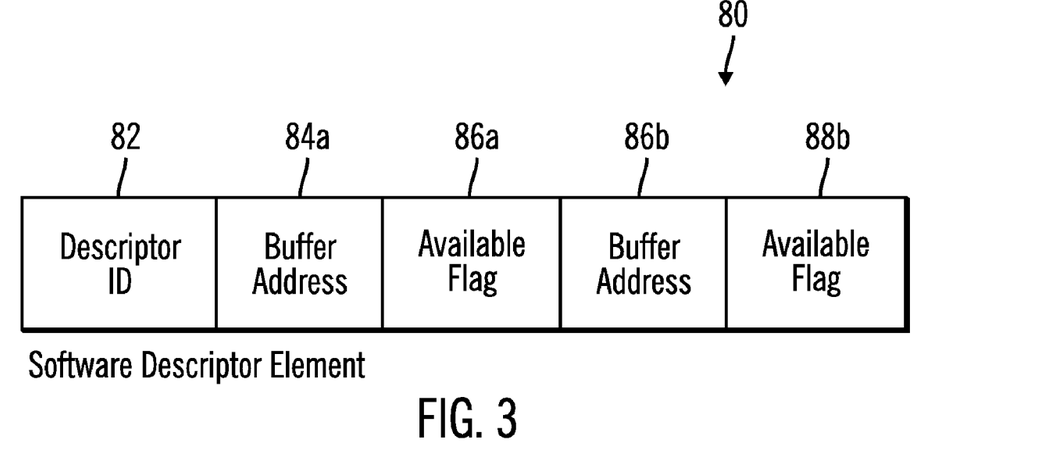
FIGS. 3 and 4 illustrate fields that may be included with descriptor information in accordance with embodiments of the invention.

FIG. 3 illustrates information 80 maintained with a software descriptor element 18a, 18b . . . 18n, including a descriptor identifier 82, buffer addresses 84a, 84b of buffers preassigned to that descriptor, and available flags 86a, 86b for each buffer address 84a, 84b, respectively, indicating whether the respective buffer is available for use. Thus, in the event one buffer, e.g., buffer 20a, is being processed by the protocol driver 26, the other buffer, e.g., 22b, operates as a reserve buffer that may be assigned to the hardware descriptor for use by the network adapter 12. In certain embodiments, the descriptor identifier 82 may not be used and the descriptor may be identified without having a stored identifier.

Figure 4:
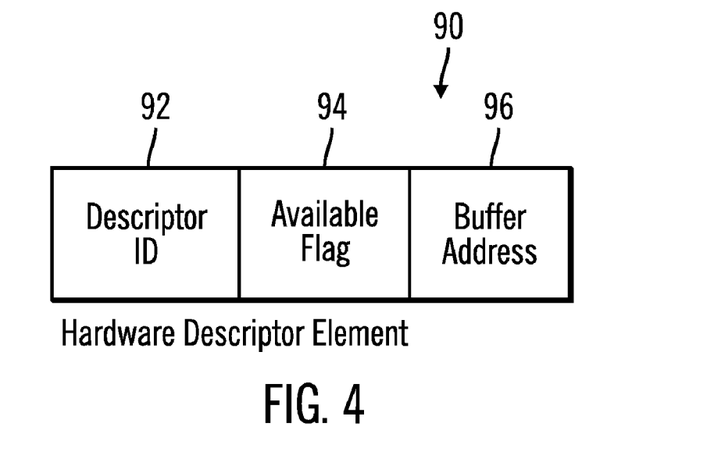

FIG. 4 illustrates information 90 the adapter controller 32 maintains for each hardware descriptor element 34a, 34b . . . 34n, including a descriptor identifier 92, an available flag 94 indicating whether that descriptor is available to receive a packet, and a buffer address 96 of one of the preassigned buffers 20a, 20b . . . 20n, 22a, 22b . . . 22n to use. The buffer address 96 would comprise one of the addresses 84a, 84b indicated in the corresponding software descriptor element.

Figure 5:
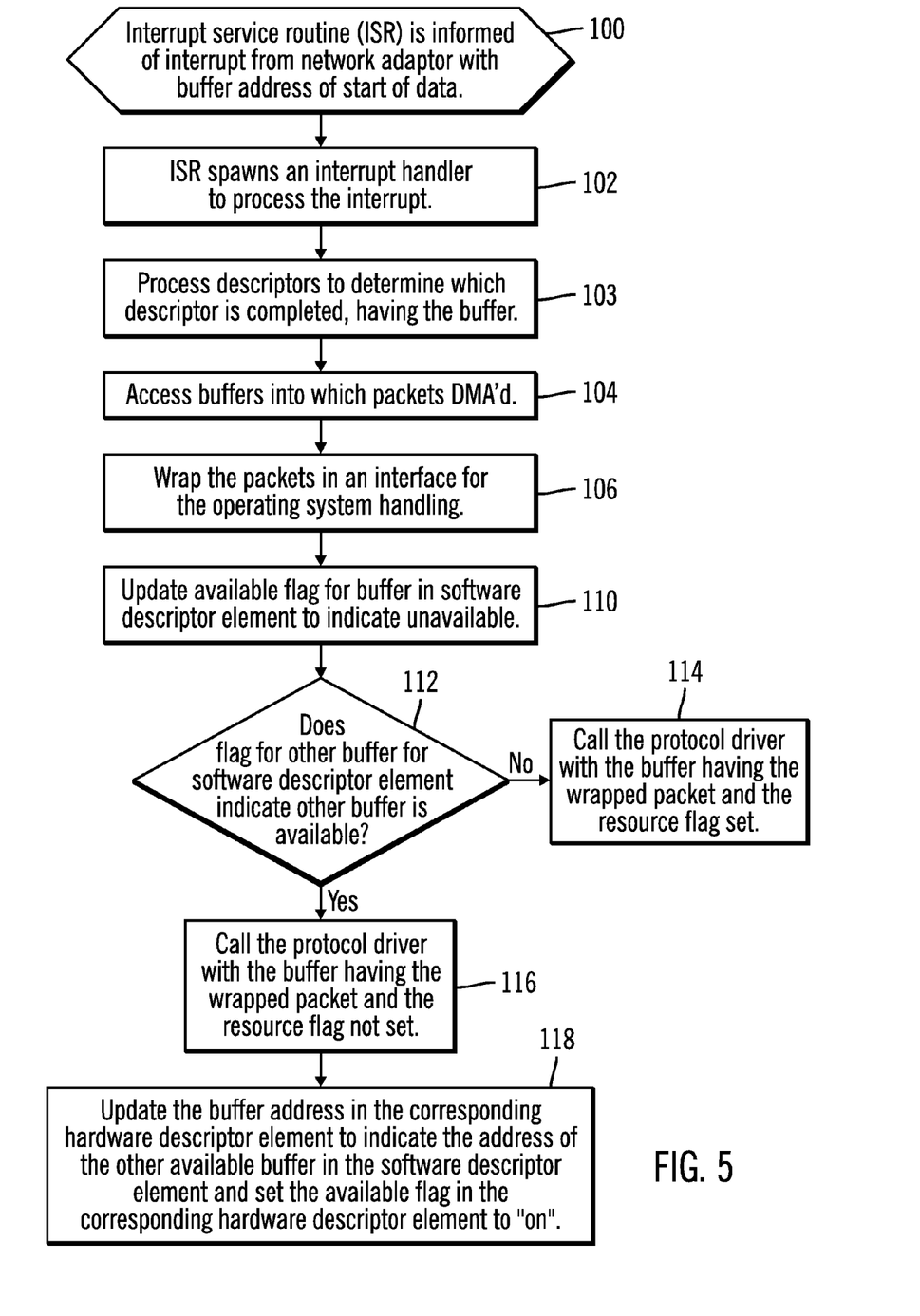
FIGS. 5, 6, 7, and 8 illustrates operations performed to process packet buffers in accordance with embodiments of the invention.

FIG. 5 illustrates operations performed by the interrupt service routine 50 to process an interrupt signal received from the network adapter 12 after the DMA engine 22 writes packets to buffers for available hardware descriptor elements 34a, 34b. . . 34n. The interrupt service routine 50 may learn of an interrupt when a buffer is written. Upon being informed (at block 100) of an interrupt, the interrupt service routine 50 spawns (at block 102) an interrupt handler 52 to service the interrupt. The interrupt service routine 50 may further acknowledge the interrupt by deasserting an interrupt line. The interrupt handler 52 may process the descriptors 18 to determine the descriptors 18a, 18b . . . 18n having completed or "done" status has completed in order to manipulate the buffer associated with the determined descriptors 18a, 18b . . . 18n having the buffer 84a, 84b (FIG. 3) with the new packet. The interrupt handler 52 would access (at block 104) the buffers into which the DMA engine 22 wrote the packets and then wrap (at block 106) the packets in an interface for use by the protocol driver 26 and operating system. The interrupt handler 52 updates (at block 110) the available flag 86a, 86b for that buffer 84a, 84b to indicate unavailable. The interrupt handler 52 may process the one or more packets DMA'd into memory 6 at the time the interrupt was processed at block 100 or any packets DMA'd into memory after the interrupt was received that are located by the interrupt handler 52 when processing the descriptors 18 to determine buffers having data.

If (at block 112) the available flag 86a, 86b for the other buffer 84a, 84b for the determined software descriptor element 18a, 18b . . . 18n not having the new packet indicates that the other buffer is available, then the interrupt handler 52 calls (at block 116) the protocol driver 24 with the buffer having the wrapped packet and the resource flag not set. The resource flag may comprise a field in the buffer 20a, 20b . . . 20n, 22a, 22b . . . 22n or a parameter in the call to the protocol driver 24 indicating the buffer 20a, 20b . . . 20n, 22a, 22b . . . 22n to process. The interrupt handler 52 further updates (at block 118) the buffer address 96 (FIG. 4) of the corresponding hardware descriptor element 34a, 34b . . . 34n to indicate the address of the other buffer indicated in the software descriptor element that is available and sets the available flag 94 in the hardware descriptor element to "on". If (at block 112) the other buffer is not available, then the interrupt handler 52 calls (at block 114) the protocol driver 24 with the buffer having the wrapped packet and the resource flag set "on".

With the logic of FIG. 5, if the reserve buffer or buffer other than the buffer provided to the protocol driver 24 is available, then that buffer is made immediately available to the network adapter 12 to use for that descriptor. In this way, the network adapter DMA engine 22 can use a descriptor immediately after writing to the descriptor and generating the interrupt signal without having to wait for a protocol stack thread 54 to complete processing the packet and return the buffer. Further, if the reserve or other buffer for a descriptor is not available, then setting the resource flag signals the protocol driver 24 to immediately return the buffer to the interrupt handler 52 to return to the network adapter 12 to use, thereby further avoiding delays resulting from having to wait for the protocol stack thread 54 to complete processing the packet and release the buffer. With the described logic, buffers are soon returned to the hardware descriptors without any need to lock access to the hardware and software descriptors because a single interrupt handler thread accesses the hardware and software descriptors, as opposed to having multiple protocol stack threads trying to update the hardware and software descriptors.

Further, the operations described in FIG. 5 may be performed in a different order and need not be processed in a sequential manner as shown on every descriptor and packet processed. For instance, operations 103–112 and 118 may be performed for multiple packets before indicating the packets to the protocol driver 24, and then operations 114 or 116 may be performed for multiple buffers, not just one. Further, operation 118 can be performed before 116 and may be performed for several descriptors at once. Further, in operation 118, the hardware may be notified by setting the available flag "on" for multiple descriptors when the descriptors are submitted to the network adapter 12 in batches. Descriptors may be submitted in batches to reduce the overhead and latency on the bus 28.

Figure 6:
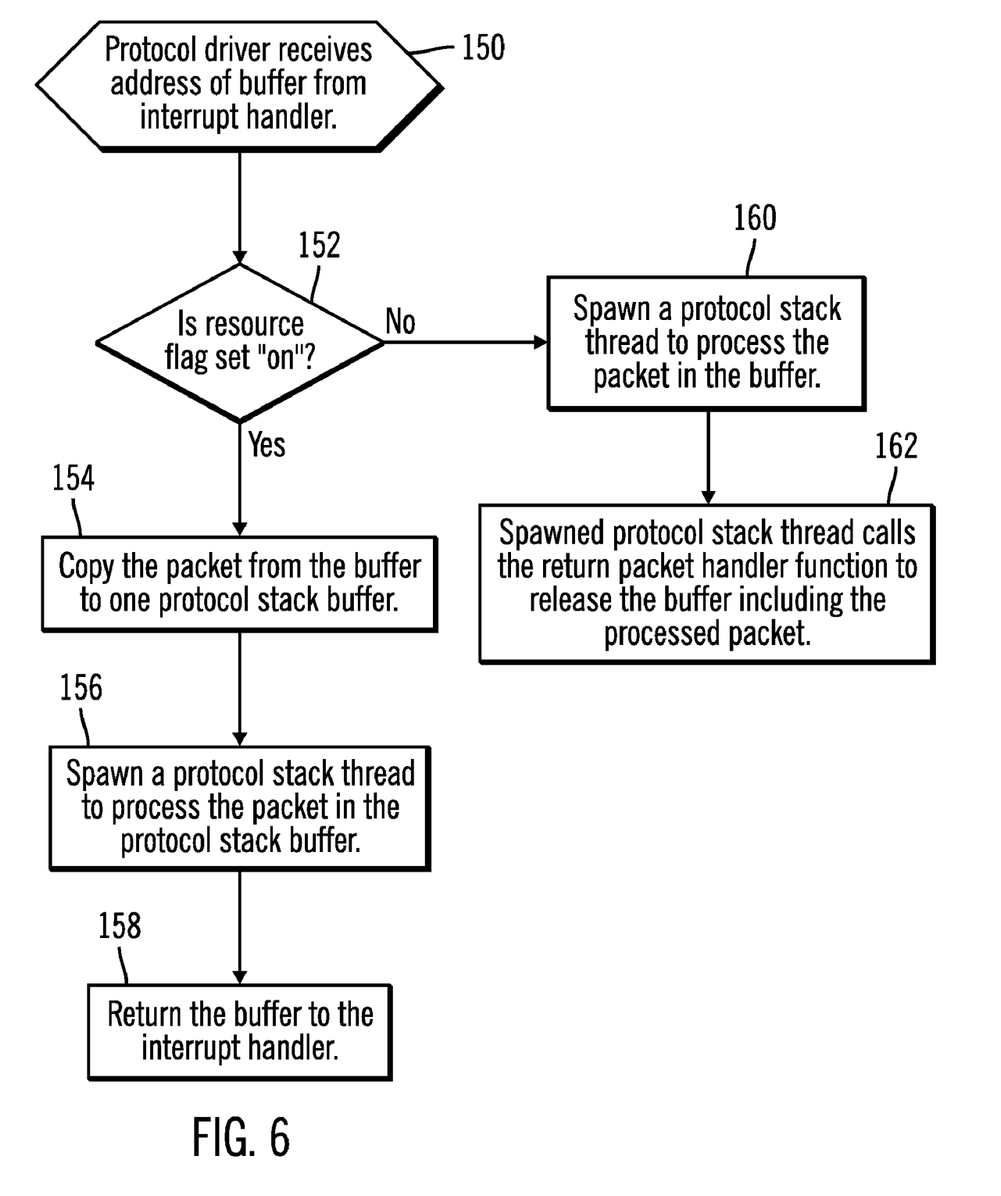

FIG. 6 illustrates operations performed by the protocol driver 24 to process the call from the interrupt handler 52 to process a buffer 20a, 20b . . . 20n, 22a, 22b . . . 22n having a new packet. Upon receiving (at block 150) the address of the buffer to process from the interrupt handler 52, if (at block 152) the resource flag for the buffer is set, indicating that the other buffer for the software descriptor element 80 is not available, then the protocol driver 24 copies (at block 154) the packet from the descriptor buffer to a protocol stack buffer 28. The protocol driver 24 would spawn (at block 156) a protocol stack thread 54 to process the packet in the protocol stack buffer 28. The packet buffer 20a, 20b . . . 20n, 22a, 22b . . . 22n just copied would be returned (at block 158) to the interrupt handler 52 to reuse with the hardware descriptor element 34a, 34b . . . 34n to which the returned buffer is assigned. If (at block 152) the resource flag is not set, indicating that the other buffer is available, then the protocol driver 24 spawns (at block 160) a protocol stack thread 54 to process the packet in the buffer 20a, 20b . . . 20n, 22a, 22b . . . 22n. Alternatively, the same thread on which the protocol driver 24 is executing may perform the operations of the protocol stack thread 54 to process the packet. After completing the processing of the packet, the protocol stack thread 54 would call (at block 162) a return packet handler function to release the buffer 20a, 20b . . . 20n, 22a, 22b . . . 22n including the processed packet.

Figure 7:
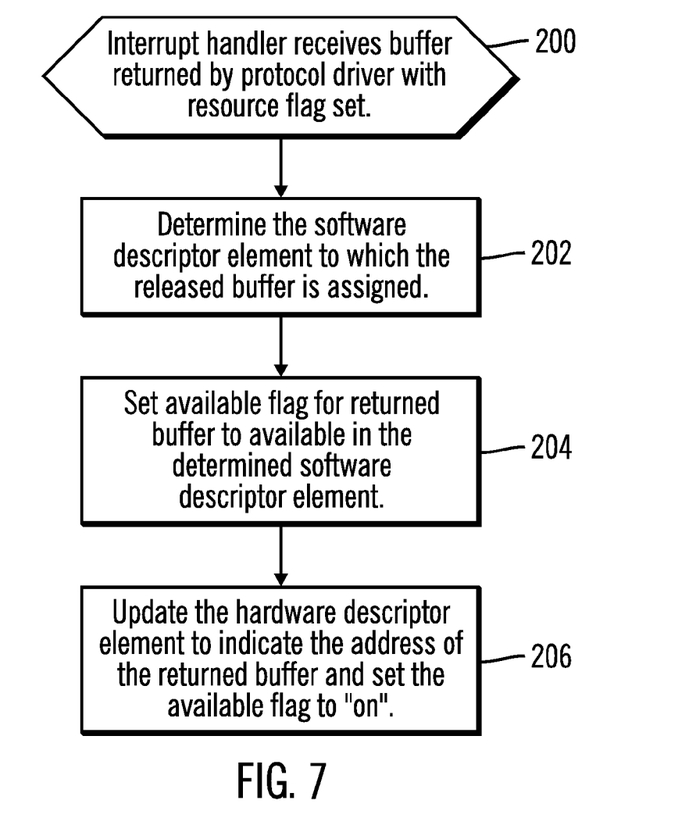

FIG. 7 illustrates operations performed by the interrupt handler 52 when receiving a buffer 20a, 20b . . . 20n, 22a, 22b . . . 22n returned by the protocol driver 24 with the resource flag set "on", indicating that the protocol driver 24 copied the packet in the buffer to the protocol stack buffers 28 and returned the buffer immediately to be reassigned to the hardware descriptor element. In response to receiving the returned buffer (at block 200), the interrupt handler 52 determines (at block 202) the software descriptor 18a, 18b . . . 18n to which the released buffer is assigned. The interrupt handler 52 sets (at block 204) the available flag 86a, 86b for the returned buffer 84a, 84b to available in the determined software descriptor element 18a, 18b . . . 18n. The interrupt handler 52 further updates (at block 206) the hardware descriptor element 34a, 34b . . . 34n corresponding to the determined software descriptor element to indicate the address of the returned buffer in the buffer address field 96 and sets the available flag 94 to "on" to indicate to the DMA engine 22 that the buffer for that descriptor may be used.

Figure 8:
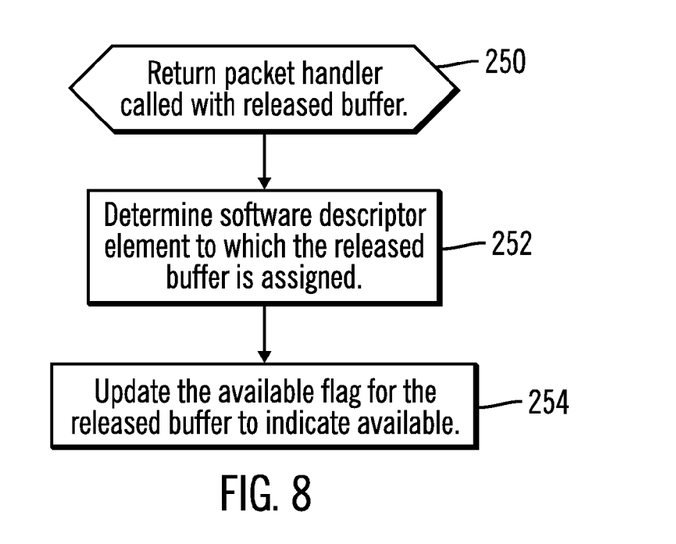

FIG. 8 illustrates operations performed by the returned packet handler function 56 in response to a call from a protocol stack thread 54 that has completed processing the packet in the buffer. Upon being invoked (at block 250), the return packet handler 56 determines (at block 252) the software descriptor element 18a, 18b . . . 18n to which the released buffer is assigned. The available flag 86a, 86b for the released buffer 84a, 84b is then set (at block 254) to indicate the availability of that buffer to be used for the descriptor to which it is assigned.

The described embodiments provide a technique to make a buffer immediately 20a, 20b . . . 20n, 22a, 22b . . . 22n available to a hardware descriptor by using one of multiple available buffers assigned to a descriptor after one of the assigned buffers is used by the network adapter. In this way, a reserve buffer pre-assigned to the descriptor is available for immediate use with the descriptor after the network adapter writes to another of the buffers pre-assigned to the descriptor. Further, if all the buffers pre-assigned to a descriptor are not available for use, then the interrupt handler will request that the protocol driver immediately release the buffer so it can be available for immediate use with the descriptor.

In certain embodiments, no synchronization and locks are used to access the descriptor control structures in software and hardware because only one thread of execution will access the descriptor data structures. For instance, only the interrupt handler thread sets the status as unavailable and updates the hardware descriptor elements and only one thread, the return packet handler, will set the software descriptor element to indicate that a buffer is available for reuse with the pre-assigned hardware descriptor. The return packet handler 56 may run on the same thread as the interrupt handler 52 and the protocol driver or on different threads. In certain embodiments, if the resource flag is set, then the return packet handler and interrupt handler, as well as protocol driver, would run on the same thread, and, if the resource flag is not sent, then the return packet handler 56 would run on a different thread than the interrupt handler 52. Having the protocol driver and interrupt handler execute on the same thread would prevent conflicting accesses and incoherency with the software and hardware descriptor data structures because only a single thread would be updating the information, either the interrupt or return packet handler threads.

Additional Embodiment Details

The described techniques for processing packet buffers from a network adapter may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the device driver 20, protocol driver, interrupt handler, network adapter, etc. In alterative embodiments, operations described as performed by certain components may be performed by other or additional components.

In described embodiments, there were two buffers assigned to each descriptor and available for use with the hardware descriptor. In additional embodiments, there may be more than two buffers available for each descriptor, which would require additional buffer address and available flag fields in the software descriptor element data structure to maintain information on such additional buffers used for a descriptor.

In the described embodiments, the device utilizing the buffers comprises a network adapter. In alternative embodiments, the device writing to the packets and using the hardware descriptors to determine available buffers to write packets may comprise any I/O device known in the art that returns data to the system.

In described implementations, certain operations are attributed to the protocol driver, which may comprise a network protocol driver. In alternative operations, certain of the operations described as performed by the protocol drivers or other of the drivers may be performed by an intermediate driver or operating system element.

FIGS. 3 and 4 illustrate information included in software and hardware descriptors. In alternative implementation, these data structures may include additional or different information than illustrated in the figures.

The illustrated logic of FIGS. 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 9:
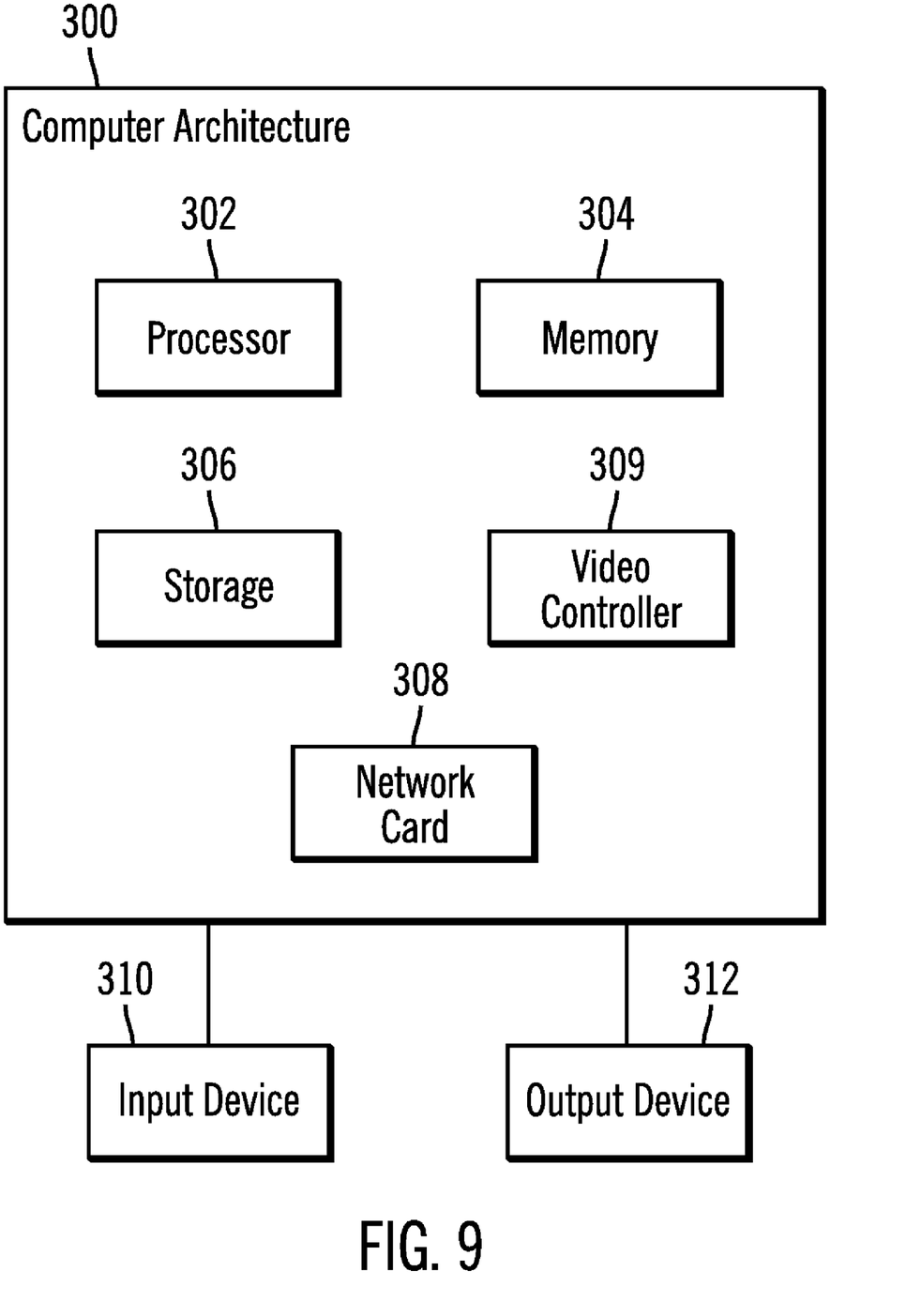
FIG. 9 illustrates an architecture that may be used with the described embodiments.

FIG. 9 illustrates one implementation of a computer architecture 300 of the network components, such as the hosts and storage devices shown in FIGS. 1, 2, and 3. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network, such as an Ethernet, a Fibre Channel Arbitrated Loop, etc. Further, the architecture may, in certain embodiments, include a video controller 309 to render information on a display monitor, where the video controller 309 may be implemented on a video card or integrated on integrated circuit components mounted on the motherboard. As discussed, certain of the network devices may have multiple network cards. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The network adapter 12, 308 may be implemented on a network card, such as a Peripheral Component Interconnect (PCI) card or some other I/O card, or on integrated circuit components mounted on the motherboard.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing packets from an Input/Output (I/O) device, comprising:

maintaining information indicating a different pair of a first buffer and a second buffer assigned to each of a plurality of descriptors, wherein one of the first and second buffers assigned to one descriptor is used by the I/O device, and wherein the I/O device writes packets to the buffers assigned to the descriptors;

accessing the first buffer including a packet from the I/O device, wherein the accessed first buffer is assigned to an accessed descriptor that is one of the plurality of descriptors;

processing the packet in the accessed first buffer; and if the second buffer assigned to the accessed descriptor is available, then updating information for the accessed descriptor to indicate that the second buffer is assigned to the accessed descriptor before completing the processing of the packet in the first buffer.

2. The method of claim 1, further comprising:

after completing the processing of the packet in the first buffer, indicating that the first buffer is available for assignment to the accessed descriptor.

3. The method of claim 1, further comprising:

if the second buffer assigned to the accessed descriptor is not available when proceeding to process the packet in the buffer, then copying the packet in the first buffer to a temporary buffer to process; and after copying the packet in the first buffer to the temporary buffer, updating information for the accessed descriptor used by the I/O device to indicate that the first buffer is assigned to the descriptor and available for use by the I/O device.

4. The method of claim 3, wherein the operations of accessing the first buffer, copying the packet in the first buffer to the temporary buffer, and updating information for the accessed descriptor to indicate that the first buffer is assigned to the accessed descriptor and available are performed on a single thread of execution.

5. The method of claim 4, wherein the operations of accessing the first buffer and updating information for the accessed descriptor to indicate that the first buffer is assigned to the accessed descriptor and available are performed by an interrupt handler invoked in response to an interrupt signal from the I/O device and the operation of copying the packet in the first buffer to the temporary buffer is performed by a protocol driver.

6. The method of claim 5, further comprising:

returning, by the protocol driver, the first buffer to the interrupt handler after copying the packet in the first buffer to the temporary buffer, wherein the interrupt handler updates information for the accessed descriptor to indicate that the first buffer is assigned to the accessed descriptor and available for use by the I/O device.

7. The method of claim 1, wherein processing the packet in the first buffer comprises:

calling a protocol driver to process the packet in the first buffer, wherein the protocol driver spawns a protocol thread to process the packet and wherein the protocol thread calls a function to indicate that the first buffer is available for assignment to the accessed descriptor after completing the copying of the first packet in the first buffer.

8. The method of claim 1, wherein the I/O device comprises a network adapter that writes packets directly to buffers assigned to descriptors that are indicated as available, further comprising:

generating an interrupt signal, with the I/O device, after writing at least one packet to at least one buffer assigned to at least one descriptor, wherein the first buffer including the packet is accessed after the interrupt signal is received.

9. The method of claim 1, wherein there are at least two buffers assigned to each descriptor.

10. The method of claim 1, wherein for each descriptor there is one software descriptor and one hardware descriptor, wherein the software descriptor indicates the first and second buffers capable of being assigned to the descriptor and the hardware descriptor indicates one buffer assigned to the descriptor and the availability of the buffer assigned to the descriptor to receive data from the I/O device.

11. A system, comprising:

a processor;

a storage device;

an Input/Output (I/O) device;

a storage controller for managing access to the storage device;

at least one program that when executed by the processor performs:

(i) maintain information indicating a different pair of a first buffer and a second buffer assigned to each of a plurality of descriptors, wherein one of the first and second buffers assigned to the one descriptor is used by the I/O device, and wherein the I/O device writes packets to the buffers assigned to the descriptors;

(ii) access the first buffer including a packet from the I/O device, wherein the accessed first buffer is assigned to an accessed descriptor that is one of the plurality of descriptors;

(iii) process the packet in the accessed first buffer; and (iv) if the second buffer assigned to the accessed descriptor is available, then update information for the accessed descriptor to indicate that the second buffer is assigned to the accessed descriptor before completing the processing of the packet in the first buffer.

12. The system of claim 11, wherein the at least one program that when executed by the processor further performs:

after completing the processing of the packet in the first buffer, indicate that the first buffer is available for assignment to the accessed descriptor.

13. The system of claim 11, wherein the at least one program that when executed by the processor further performs:

if the second buffer assigned to the accessed descriptor is not available when proceeding to process the packet in the buffer, then copy the packet in the first buffer to a temporary buffer to process; and after copying the packet in the first buffer to the temporary buffer, update information for the accessed descriptor used by the I/O device to indicate that the first buffer is assigned to the descriptor and available for use by the I/O device.

14. The system of claim 13, wherein the operations of accessing the first buffer, copying the packet in the first buffer to the temporary buffer, and updating information for the accessed descriptor to indicate that the first buffer is assigned to the accessed descriptor and available are performed on a single thread of execution.

15. The system of claim 14, wherein the at least one program includes an interrupt handler, invoked in response to an interrupt signal from the I/O device, to perform the operations of accessing the first buffer and updating information for the accessed descriptor to indicate that the first buffer is assigned to the accessed descriptor and available and wherein the at least one program includes a protocol driver to perform the operation of copying the packet in the first buffer to the temporary buffer.

16. The system of claim 15, wherein the protocol driver further performs:
return the first buffer to the interrupt handler after copying the packet in the first buffer to the temporary buffer, wherein the interrupt handler updates information for the accessed descriptor to indicate that the first buffer is assigned to the accessed descriptor and available for use by the I/O device.

17. The system of claim 11, wherein processing the packet in the first buffer comprises:
calling a protocol driver to process the packet in the first buffer, wherein the protocol driver spawns a protocol thread to process the packet and wherein the protocol thread calls a function to indicate that the first buffer is available for assignment to the accessed descriptor after completing the copying of the first packet in the first buffer.

18. The system of claim 11, wherein the I/O device comprises a network adapter that writes packets directly to buffers assigned to descriptors that are indicated as available, wherein the I/O device performs:
generate an interrupt signal, after writing at least one packet to at least one buffer assigned to at least one descriptor, wherein the first buffer including the packet is accessed after the interrupt signal is received.

19. The system of claim 11, wherein there are at least two buffers assigned to each descriptor.

20. The system of claim 11, wherein for each descriptor there is one software descriptor and one hardware descriptor, wherein the software descriptor indicates the first and second buffers capable of being assigned to the descriptor and the hardware descriptor indicates one buffer assigned to the descriptor and the availability of the buffer assigned to the descriptor to receive data from the I/O device.

21. An article of manufacture comprising a hardware device having code for processing packets from an Input/Output (I/O) device, wherein the code causes operations to be performed, the operations comprising:
maintaining information indicating a different pair of a first buffer and a second buffer assigned to each of a plurality of descriptors, wherein one of the first and second buffers assigned to one descriptor is used by the I/O device, and wherein the I/O device writes packets to the buffers assigned to the descriptors;
accessing the first buffer including a packet from the I/O device, wherein the accessed first buffer is assigned to an accessed descriptor that is one of the plurality of descriptors;
processing the packet in the accessed first buffer; and
if the second buffer assigned to the accessed descriptor is available, then updating information for the accessed descriptor to indicate that the second buffer is assigned to the accessed descriptor before completing the processing of the packet in the first buffer.

22. The article of manufacture of claim 21, wherein the operations further comprise:
after completing the processing of the packet in the first buffer, indicating that the first buffer is available for assignment to the accessed descriptor.

23. The article of manufacture of claim 21, wherein the operations further comprise:
if the second buffer assigned to the accessed descriptor is not available when proceeding to process the packet in the buffer, then copying the packet in the first buffer to a temporary buffer to process; and
after copying the packet in the first buffer to the temporary buffer, updating information for the accessed descriptor used by the I/O device to indicate that the first buffer is assigned to the descriptor and available for use by the I/O device.

24. The article of manufacture of claim 23, wherein the operations of accessing the first buffer, copying the packet in the first buffer to the temporary buffer, and updating information for the accessed descriptor to indicate that the first buffer is assigned to the accessed descriptor and available are performed on a single thread of execution.

25. The article of manufacture of claim 24, wherein the operations of accessing the first buffer and updating information for the accessed descriptor to indicate that the first buffer is assigned to the accessed descriptor and available are performed by an interrupt handler invoked in response to an interrupt signal from the I/O device and the operation of copying the packet in the first buffer to the temporary buffer is performed by a protocol driver.

26. The article of manufacture of claim 25, wherein the operations further comprise:
returning, by the protocol driver, the first buffer to the interrupt handler after copying the packet in the first buffer to the temporary buffer, wherein the interrupt handler updates information for the accessed descriptor to indicate that the first buffer is assigned to the accessed descriptor and available for use by the I/O device.

27. The article of manufacture of claim 21, wherein processing the packet in the first buffer comprises:
calling a protocol driver to process the packet in the first buffer, wherein the protocol driver spawns a protocol thread to process the packet and wherein the protocol thread calls a function to indicate that the first buffer is available for assignment to the accessed descriptor after completing the copying of the first packet in the first buffer.

28. The article of manufacture of claim 21, wherein the I/O device comprises a network adapter that writes packets directly to buffers assigned to descriptors that are indicated as available, wherein the operations further comprise:
generating an interrupt signal, with the I/O device, after writing at least one packet to at least one buffer assigned to at least one descriptor, wherein the first buffer including the packet is accessed after the interrupt signal is received.

29. The article of manufacture of claim 21, wherein there are at least two buffers assigned to each descriptor.

30. The article of manufacture of claim 21, wherein for each descriptor there is one software descriptor and one hardware descriptor, wherein the software descriptor indicates the first and second buffers capable of being assigned to the descriptor and the hardware descriptor indicates one buffer assigned to the descriptor and the availability of the buffer assigned to the descriptor to receive data from the I/O device.

31. The article of manufacture of claim 21, wherein the hardware device comprises at least one of hardware logic in which the code is implemented and a computer readable device from which the code is accessed and executed by a processor.

* * * * *